United States Patent
Farha et al.

(10) Patent No.: US 9,023,237 B2
(45) Date of Patent: May 5, 2015

(54) HIGHLY ACTIVE NANO IRON CATALYST FOR THE ABSORPTION OF HYDROGEN SULFIDE

(71) Applicant: New Technology Ventures, Inc., Oklahoma City, OK (US)

(72) Inventors: Floyd E. Farha, Oklahoma City, OK (US); Veronica M. Irurzun, Norman, OK (US)

(73) Assignee: New Technology Ventures, Inc., Norman, OK (US)

( * ) Notice: Subject to any disclaimer, the term of this patent is extended or adjusted under 35 U.S.C. 154(b) by 0 days.

(21) Appl. No.: 13/921,600

(22) Filed: Jun. 19, 2013

(65) Prior Publication Data

US 2014/0374654 A1    Dec. 25, 2014

(51) Int. Cl.
| | | |
|---|---|---|
| C10G 25/00 | (2006.01) | |
| C10G 49/00 | (2006.01) | |
| B01D 53/52 | (2006.01) | |
| C01G 49/04 | (2006.01) | |
| C01G 49/00 | (2006.01) | |

(52) U.S. Cl.
CPC ............. *C10G 25/003* (2013.01); *C01G 49/04* (2013.01); *B01D 53/52* (2013.01); *C01G 49/009* (2013.01)

(58) Field of Classification Search
None
See application file for complete search history.

(56) References Cited

U.S. PATENT DOCUMENTS

| | | | |
|---|---|---|---|
| 1,852,497 A | | 4/1932 | Woodhouse |
| 1,882,000 A | | 10/1932 | Cross |
| 2,335,760 A | * | 11/1943 | Hucks ................ 106/169.56 |
| 2,362,670 A | * | 11/1944 | Schulze ................ 423/561.1 |
| 2,433,426 A | | 12/1947 | Capell et al. |
| 2,503,528 A | | 4/1950 | Walker et al. |
| 2,641,526 A | * | 6/1953 | Leutz ........................ 423/223 |
| 2,747,962 A | | 5/1956 | Heitz et al. |
| 2,897,150 A | | 7/1959 | Bencowitz |
| 3,199,946 A | | 8/1965 | Fujita et al. |
| 3,252,758 A | * | 5/1966 | Abeck et al. ............. 423/634 |
| 3,618,667 A | | 11/1971 | Snavely, Jr. |
| 3,666,404 A | | 5/1972 | Hwa et al. |
| 3,912,646 A | | 10/1975 | Leitner et al. |
| 3,928,709 A | * | 12/1975 | Audran et al. ........... 428/842.5 |

(Continued)

FOREIGN PATENT DOCUMENTS

| | | |
|---|---|---|
| EP | 0086919 | 8/1983 |
| SU | 914611 A1 | 3/1982 |
| WO | WO 2007/035435 A1 | 3/2007 |

OTHER PUBLICATIONS

Database WPI Week 198305 Thomson Scientific, London, GB; AN 1983-11512K, XP002564632.

(Continued)

*Primary Examiner* — Joseph D Anthony
(74) *Attorney, Agent, or Firm* — Locke Lord, LLP (57) ABSTRACT

The invention involves the formation of a stable iron (II) oxide and/or hydroxide. Preferably these oxides and/or hydroxides are present as nanoparticles in the 5-10 nanometer range. It has been discovered that such particles can be formed at lower cost and with fewer impurities by using ferrous carbonate ($FeCO_3$) from siderite as compared to known processes from various iron salts such as sulfates and chlorides. The novel nanoparticles are particularly adapted to removing sulfur compounds such as $H_2S$ from liquid and/or gaseous streams, such as hydrocarbon streams.

66 Claims, 4 Drawing Sheets
(2 of 4 Drawing Sheet(s) Filed in Color)

(56) References Cited

U.S. PATENT DOCUMENTS

| | | | |
|---|---|---|---|
| 3,980,752 A * | 9/1976 | Fekete et al. | 423/92 |
| 4,008,775 A | 2/1977 | Fox | |
| 4,061,716 A | 12/1977 | McGauley | |
| 4,101,635 A | 7/1978 | Nambu et al. | |
| 4,134,858 A * | 1/1979 | Courty | 502/63 |
| 4,178,416 A * | 12/1979 | Hector et al. | 428/842.5 |
| 4,289,746 A * | 9/1981 | Hayakawa et al. | 423/633 |
| 4,323,544 A | 4/1982 | Magder | |
| 4,344,842 A | 8/1982 | Fox | |
| 4,366,131 A | 12/1982 | Fox | |
| 4,376,032 A | 3/1983 | Givens | |
| 4,382,918 A | 5/1983 | Diaz | |
| 4,476,027 A | 10/1984 | Fox | |
| 4,516,984 A | 5/1985 | Warner et al. | |
| 4,629,571 A | 12/1986 | Salem et al. | |
| 4,705,638 A | 11/1987 | Ganczarczyk | |
| 4,753,722 A | 6/1988 | Le et al. | |
| 4,835,043 A | 5/1989 | Fox et al. | |
| 4,956,160 A | 9/1990 | Reichert | |
| 5,057,291 A | 10/1991 | Fisher et al. | |
| 5,292,440 A | 3/1994 | Hardison | |
| 5,336,421 A * | 8/1994 | Kurita et al. | 252/62.62 |
| 5,378,443 A | 1/1995 | Engstrom et al. | |
| 5,399,278 A * | 3/1995 | Yamashita et al. | 252/62.56 |
| 5,466,381 A | 11/1995 | Goliaszewski et al. | |
| 5,531,922 A * | 7/1996 | Okinaka et al. | 252/62.56 |
| 5,670,445 A * | 9/1997 | Kitahara et al. | 502/406 |
| 5,914,292 A | 6/1999 | Khare et al. | |
| 5,948,269 A | 9/1999 | Stone | |
| 6,096,194 A | 8/2000 | Tsybulevskiy et al. | |
| 6,221,241 B1 | 4/2001 | Carnell et al. | |
| 6,231,661 B1 * | 5/2001 | Hayashi et al. | 106/456 |
| 6,500,237 B2 | 12/2002 | Winchester et al. | |
| 6,503,471 B1 | 1/2003 | Han et al. | |
| 6,773,604 B2 | 8/2004 | Walton et al. | |
| 7,144,626 B2 * | 12/2006 | Akai et al. | 428/402 |
| 7,342,145 B2 | 3/2008 | Wu et al. | |
| 7,566,393 B2 | 7/2009 | Klabunde et al. | |
| 7,744,841 B2 | 6/2010 | Farha | |
| 7,910,085 B2 | 3/2011 | Kawase | |
| 7,931,815 B2 | 4/2011 | Farha et al. | |
| 7,943,105 B2 | 5/2011 | Farha | |
| 8,337,805 B1 | 12/2012 | Suh et al. | |
| 8,404,031 B1 | 3/2013 | Callaway | |
| 2001/0005981 A1 | 7/2001 | Winchester et al. | |
| 2001/0031240 A1 | 10/2001 | Meisen | |
| 2003/0098281 A1 | 5/2003 | Shutt et al. | |
| 2003/0166878 A1 * | 9/2003 | Nishiya et al. | 530/412 |
| 2005/0006283 A1 | 1/2005 | Leung et al. | |
| 2005/0051753 A1 * | 3/2005 | Hayashi et al. | 252/62.56 |
| 2007/0060475 A1 | 3/2007 | Farha et al. | |

OTHER PUBLICATIONS

Roberts, M.J., et al., "Pressurized fluidized-bed hydroretorting of Eastern oil shales—sulfur control. Topical report for Subtask 3.1, In-bed sulfur capture tests; Subtask 3.2, Electrostatic desulfurization; Subtask 3.3, Microbial desulfurization and denitrification" May 1, 1992 XP002564633 US DOI: 10.2172/10181821 Dept. of Energy—Office of Scientific and Technical Information, URL: http://dx.org/10.2172/10181821, p. 24, para. 3, p. 25, para. 5.

Howard, Mike, et al., "Operating Experiences at Duke Energy Field Services Wilcox Plant with Oxygen Contamination and Amine Degradation" Presented at the 51st Laurance Reid Gas Conditioning Conference, Feb. 25-28, 2001 at the University of Oklahoma.

"H2S Scavenger Technologies" GRI Report No. GRI-94/0197 by A.J. Foral & B.H. Al-Ubaidi, The M.W. Kellogg Co., for Gas Research Institute—Report Period Jun. 1 to Aug 31, 1993.

"Desulfurization of Biogas Research & Possibilities for Greenspring," by Arne Feldmeier & Christoph Hanrott for Bioway bv, undated.

Turner, Charles F., Iron Oxide Versus Liquid Treating for Purifying Natural Gas, article, Sep. 23, 1944, pp. 191,192,195,199; US.

Dhupe, A.P. and Gokarn, A.N., Studies in the Thermal Decomposition of Natural Siderites in the Presence of Air, International Journal of Mineral Processing, Aug. 4, 1989, 28:209-220, Elsevier Science Publishers, printed in Amsterdam, The Netherlands.

Mi Mang, Yu Zhang, Zhirui Guo and Ning Gu, Facile Synthesis of Ultrathin Magnetic Iron Oxide Nanoplates by Schikorr Reaction, Nanoscale Research Letters, 2013, pp. 1-7, 8:16, www.nanoscalereslett.com/content/8/1/16.

S.P. Gubin, Yu A. Koksharov, G.B. Khomutov, G Yu Yurkov, Magnetic Nanoparticles: Preparation, Structure and Properties, Russian Chemical Reviews 74 (6) 489-520 (2005) Russia.

Maen M. Husein, Luis Patruyo, Pedro Pereira-Almao, Nashaat N. Nassar, Scavenging H2S(g) from Oil Phases by Means of Ultradspersed Sorbents, Journal of Colloid and Interface Science 342 (2010) 253-260, University of Calgary, Calgary, AB, Canada.

George G. Binder, Jr., Louis A. Carlton, Robert L. Garrett, Evaluating Barite as a Source of Soluble Carbonate and Sulfide Contamination in Drilling Fluids, Journal of Petroleum Technology, 1981, pp. 2371-2376, San Antonio, TX.

Alexander Frank Wells, Hydroxides, Structural Inorganic Chemistry, 1962, p. 545, Third edition.

* cited by examiner

Room Temperature    200 °C    400 °C    650 °C

FIG. 6

HIGHLY ACTIVE NANO IRON CATALYST FOR THE ABSORPTION OF HYDROGEN SULFIDE

BACKGROUND

1. Field of the Invention

This invention generally relates to an absorbent that is adapted for the removal of hydrogen sulfide and other sulfur species from liquid and/or gaseous streams and more particularly to a stable iron (II) oxide and/or hydroxide that is particularly adapted to absorb hydrogen sulfide and other sulfur species from liquid and/or gaseous streams. Methods for making and using the absorbent are also disclosed.

2. Description of Related Art

Various liquid and/or gaseous streams, including hydrocarbon streams such as natural gas liquids ("NGL"), crude oil, acid-gas mixtures, carbon dioxide gas and liquid streams, anaerobic gas, landfill gas, geothermal gas, and the like, also often contain significant quantities of sulfur compounds. Some sulfur compounds that are often found in such streams include hydrogen sulfide, mercaptans and dimethyldisulfide. Particularly in the case of hydrocarbon streams, these sulfur compounds generally must be removed in order to meet emission standards and pipeline requirements.

Because of the noxious, toxic and corrosive nature of sulfur-containing compounds, many different products and methods have previously been disclosed for use in removing such compounds from hydrocarbon streams. One such commercially available product is SULFATREAT® brand particulate reactant that is said to be useful for removing hydrogen sulfide and other sulfur contaminants from gases and liquids including, for example, hydrocarbon fuels and geothermal steam for sale to producers of natural gas and the like. SULFATREAT® is a federally registered trademark of M-I L.L.C. of Houston, Tex., and, in stylized form, of Gas Sweetener Associates, Inc. of Chesterfield, Mo. The SULFATREAT® material has a proprietary formulation but is believed to comprise primarily ferric oxide particles having a high surface area. Iron sponge is another commercially available material composed of ferric oxide distributed on wood chips that is being used for sulfur removal in industrial processes.

Another known process for removing hydrogen sulfide from hydrocarbon streams is the use of a caustic scrubber or amine unit. Most of these processes involve the use of an alkaline solution such as sodium hydroxide (NaOH). Compared to these processes, the disclosed stable iron (II) oxide and/or hydroxide system shows greater sulfur capacity when using the same amount and concentration of caustic solutions.

Another commercially available product is disclosed in U.S. Pat. Nos. 7,744,841 and 7,943,105. This absorbent has been found to be particularly effective at absorbing hydrogen sulfide, mercaptans, dimethyldisulfide and other sulfur-containing compounds from various fluids including natural gas, light hydrocarbon streams such as natural gas liquids, crude oil, acid gas mixtures, carbon dioxide gas and liquid streams, anaerobic gas, landfill gas, geothermal and other sulfur-containing streams. This absorbent can be composed of ferrous carbonate, most preferably siderite granules or powdered siderite that is extruded or otherwise aggregated, compacted or formed into pellets, pills or spheres using a minor amount of water and optionally a binder. The ferrous carbonate used to form these particles is generally of a size where 90% pass through a 100 mesh screen, which corresponds to approximately 150 micrometers. The final absorbent preferably has dimensions ranging from about 4 to about 12 mesh or about 1.7-4.7 mm. and is deep red in color. This sorbent is capable of achieving sulfur loading of 10 to 20% by weight of the sorbent (25-50% based on iron content).

Despite the commercial success of the products covered by U.S. Pat. Nos. 7,744,841 and 7,943,105, there is still a need for an improved absorbent that is capable of removing sulfur compounds from liquid and/or gaseous streams, and in particular hydrogen sulfide from hydrocarbon streams.

BRIEF DESCRIPTION OF THE INVENTION

The invention involves the formation of a stable iron (II) oxide and/or hydroxide. Preferably these oxides and/or hydroxides are present as nanoparticles in the 5-10 nanometer range. It has been discovered that such particles can be formed at lower cost and with fewer impurities by using ferrous carbonate ($FeCO_3$) from siderite as compared to known processes from various iron salts such as sulfates and chlorides. The novel nanoparticles are particularly adapted to remove sulfur compounds such as hydrogen sulfide ($H_2S$) from liquid and/or gaseous streams.

BRIEF DESCRIPTION OF FIGURES

The patent or application file contains at least one drawing executed in color. Copies of this patent or patent application publication with color drawing(s) will be provided by the Office upon request and payment of the necessary fee.

For a more complete understanding of the present invention and for further advantages thereof, reference is now made to the following description taken in conjunction with the accompanying drawings in which.

DESCRIPTION OF THE PREFERRED EMBODIMENTS

The present invention can be better understood by the following discussion of the manufacture and use of certain preferred embodiments. All data disclosed below regarding time, temperature, amount of components, concentration in % by weight, etc. are to be interpreted as also including all values lying in the range of the respective measuring accuracy known to the person skilled in the art. All disclosed ranges are to be interpreted as also including all values lying within the stated range. Unless otherwise stated, technical grades of the various materials were used in the preferred embodiments.

In a preferred embodiment, the novel stable iron (II) oxides and/or hydroxides are prepared from ferrous carbonate (iron (II) carbonate or $FeCO_3$) and more preferably from siderite. Siderite predominantly comprises ferrous carbonate, and is usually found naturally in combination with some calcium, magnesium or manganese. For use in the compositions and various methods of the invention, the siderite can be sourced in the form of chunks, granules, or finely divided powder. If sourced in chunks, the chunks are desirably reduced to granules of a suitable size or powdered prior to use. Although it will be appreciated upon reading this disclosure that ferrous carbonate can be synthesized, the use of ferrous carbonate obtained in naturally occurring siderite mineral ores is preferred for economic reasons. Hawley's Condensed Chemical Dictionary (Twelfth Edition) reports that siderite ores naturally occur in Vermont, Massachusetts, Connecticut, New York, North Carolina, Pennsylvania, Ohio and Europe.

Representative Siderite Analysis

A processed siderite composition having a bulk density of 110 pounds per cubic foot, a specific gravity of 3.63 and a particle size of 90% through 100 mesh, has the following analysis:

|  | wt % |
| --- | --- |
| Fe (elemental) | 43.00% |
| $FeCO_3$ | 86.87 |
| $SiO_2$ | 5.50 |
| $Al_2O_3$ | 1.30 |
| CaO | 0.56 |
| MgO | 0.53 |
| S | 0.40 |
| Mn | 0.35 |
| Cu | 0.30 |
| Co | 0.02 |
| Cd | 0.0041 |
| Pb | 0.0001 |
| As | 0.00005 |
| Sb | 0.00005 |
| $Fe_2O_3$ | <1.0 |

Pristine siderite particles are typically 100 mesh (approx. 150 micrometers), are light brown in color and do not stay suspended in water or alkaline solutions unless agitation is used. When suspended in alkaline solutions at room temperature, siderite particles are stable since their color remains the same. However, it has been discovered that if the siderite particles are suspended in an alkaline solution and also heated to at least about 40-50° C., the particles will gradually darken until they turn black. If the particles are removed from the alkaline solution by filtration and washed with water, the black particles will revert to a brown color.

This proves that the ferrous carbonate in the siderite has been converted to iron (II) oxides and/or hydroxides, which are being stabilized by the alkaline solution. Iron (II) oxide is a black colored powder that is not soluble in water, alkali or alcohol. It is also thermodynamically unstable in air at temperatures below 575° C. and will disproportionate to metal and the iron (III) oxide ($Fe_3O_4$). Thus, iron (II) oxides are rarely found in nature since they are so unstable. Iron (II) hydroxide is a green colored powder (green rust) that often appears black. It is not soluble in alkali and highly unstable in water, forming $Fe_3O_4$ and $H_2$ following the Schikorr reaction. It is important to notice that all forms of iron (II) hydroxides have different atomic arrangements; therefore they would have a wide variety of tonality. While $Fe_3O_4$ is also dark in color, this species is stable in air and thus is not the black particles formed in the preferred embodiment. Although iron (II) oxides and/or hydroxides are formed in the preferred embodiment, the preferred embodiment may still contain some iron (II) carbonate, as well as other iron species including iron (III) compounds (e.g. ferric oxide) and/or mixed oxides such as $Fe_3O_4$.

The currently preferred alkaline solutions are potassium hydroxide (KOH), sodium hydroxide (NaOH) or ammonium hydroxide ($NH_4OH$). For KOH, the minimum concentration to react siderite at 40-50° C. within 10-20 minutes is about 0.7 M. In order to react it and also absorb sulfur, it is preferred to have at least a caustic to iron molar ratio of at least about 4:1 and more preferably from about 4:1 to about 6:1. For other alkaline solutions, the minimum concentration, temperatures and molar ratios could be different. It is important to mention that when NaOH was used, no additional heating was needed to react the siderite because the temperature was raised to 40-50° C. by the exothermic characteristic of the dilution of a concentrated NaOH.

The nano-sized particles of stable iron (II) oxide and/or hydroxide have been found to be especially effective at removing sulfur compounds such as $H_2S$ from liquid and/or gaseous streams. Specifically, the particles have been found to have a sulfur loading that is greater than 100% by weight of iron. This compares to the use of a solid packed bed of calcined siderite) that typically has a sulfur loading around 10-20% of the sorbent weight. Typical caustic scrubbers have to be operated at low liquid hourly space velocity (1-3 LHSV) in order to have a long contact time, ranging from 0.3-1 hours. In this case, the system was operated at higher space velocities (20 LHSV), which results in a contact time of 0.05 h, and it was still showing high sulfur loading. In the preferred embodiment, the system was operated at room temperature and atmosphere pressure, but further increases in pressure and temperature may favor the absorption process. The ability of the sorbent of the preferred embodiment to operate at short contact times and ambient temperature and pressure while still providing high sulfur loading provides a significant advantage over typical caustic scrubbers. It is important to notice that the time and area of contact can be highly improved by using the preferred design discussed below.

Without being bound by theory, it is believed that the following formula can explain the particularly high $H_2S$ absorption of these particles:

Since the iron (II) electronic configuration is $3d^6$, it can hold up to four $HS^-$ ligands. Based on this proposed structure, the calculated sulfur loading of the sorbent would be approximately 2.87 times (287%) the iron content on a weight basis. Iron, to a certain extent, could also be reacting with $H_2S$ directly to form iron sulfide as shown below:

where m, n, l and p could be any number that would balance the equation. It is reasonably expected that the spent absorbent can be regenerated by different techniques such as the addition of caustic, heating, oxidation, stripping, reaction, etc. The spent sulfide absorbent is non-hazardous since it is stable in the presence of oxygen at room temperature and has a final pH that is below 11.

The liquid and/or gaseous stream can be brought into contact with the absorbent of the preferred embodiment through the use of any method currently known or developed in the future. For example, if the stream is in the gaseous phase, a bubbler can be used to pass the gas through an alkaline solution in which the sorbent of the preferred embodiment is suspended. This catalyst could be used in batch, continuous stirred tank, tubular and packed bed flow reactors, including any type of flow (basic flow, split stream, concurrent, countercurrent, etc.) and any type of arrangement.

Figure 1:
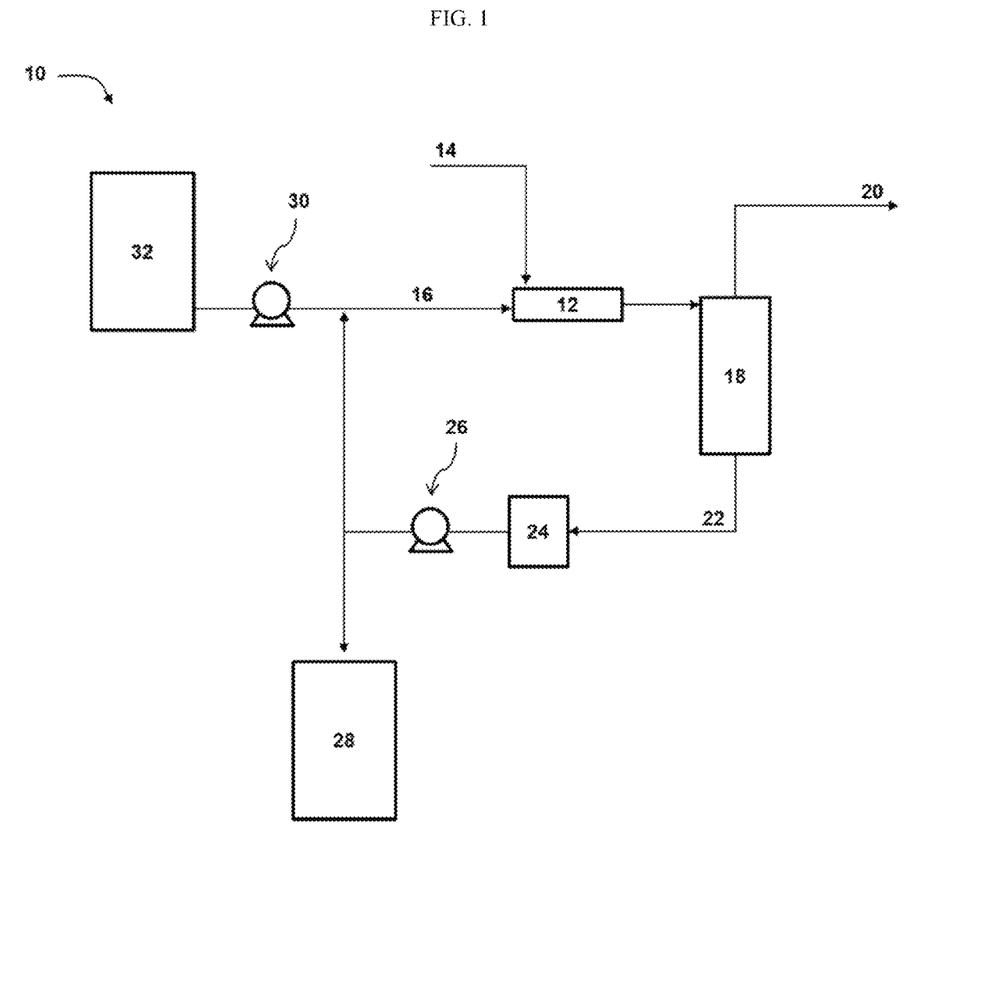
FIG. 1 is a schematic of one preferred system that can be used to contact the sorbent with a liquid and/or gaseous stream to remove $H_2S$ or other sulfur compounds from the fluid stream.

A schematic for one preferred system that can be used to contact the absorbent with a liquid and/or gaseous stream containing $H_2S$ or other sulfur compounds is shown in FIG. 1. System 10 is composed of a static mixer-reactor 12. A sour liquid and/or gaseous stream 14 and an absorbent stream 16 are combined in the mixer-reactor 12. Following a sufficient contact time in the mixer-reactor 12, the stream is passed to a separator 18. The separator 18 splits the stream into a sweetened liquid and/or gaseous stream 20, from which the sulfur compounds have been removed to the extent required or desired, and a spent sorbent stream 22. The spent sorbent stream 22 will contain both spent sorbent as well as some sorbent that had not fully reacted with the sour liquid and/or gaseous stream in the mixer-reactor 12. The spent sorbent stream 22 is sent to a surge tank 24. Pump 26 can be used to transport the spent sorbent stream to a spent absorbent tank 28 or recycle the spent sorbent stream back to the mixer-reactor 12. Fresh sorbent is also added to the mixer-reactor 12 using pump 30 from sorbent storage tank 32. Sorbent storage tank 32 is preferably configured with a stirring mechanism to keep the fresh absorbent suspended in an alkaline solution.

In addition to sulfur removal, the process for producing the novel sorbent of the current invention can also be used to produce stable iron (II) oxides and/or hydroxides for numerous other purposes as well. For example, iron nanoparticles of stable iron (II) oxide and/or hydroxide are conventionally produced from different iron salts such as sulfates and chlorides. The process disclosed herein provides an alternate method of producing these iron nanoparticles that is more economical and produces products with fewer impurities (anions). These stable iron (II) oxide and/or hydroxide particles can be used for various applications such as the production of magnetite ($Fe_3O_4$) which is used in magnetic recording media such as tapes or discs. The stable iron (II) oxide and/or hydroxide particles can also be used for the production of hydrogen, such as in the Schikorr reaction, or catalytic processes involving hydrogenation or dehydrogenation.

Further, high purity $H_2S$ could be recovered from the spent absorbent by using different techniques, for e.g. the addition of acids, and be used for the production of organosulfur compounds. To the extent that the acid used in this process is sulfuric acid or another sulfate based acid, the other resulting product of this reaction would be iron sulfate. The iron sulfate would separately be a valuable product for use in fertilizers.

The invention can be further understood by means of the following examples, which are provided to illustrate but not limit the invention.

Reference Example 1

A blank caustic solution composed of 60 ml 1M KOH solution was introduced into a glass bubbler. The sample was at room temperature and atmospheric pressure. A flow of 20 standard cubic centimeters per minute (sccm) of 6000 parts per million (ppm) of $H_2S$ in a nitrogen ($N_2$) carrier (6000 ppm of $H_2S/N_2$) was passed through the caustic solution in the bubbler. This results in a space velocity of 20 LHSV. The outlet gas was monitored by a gas chromatograph (GC) in order to quantify the amount of $H_2S$ that is absorbed. The blank was run for 76 hours before showing a breakthrough of $H_2S$.

Example 2

Figure 2:
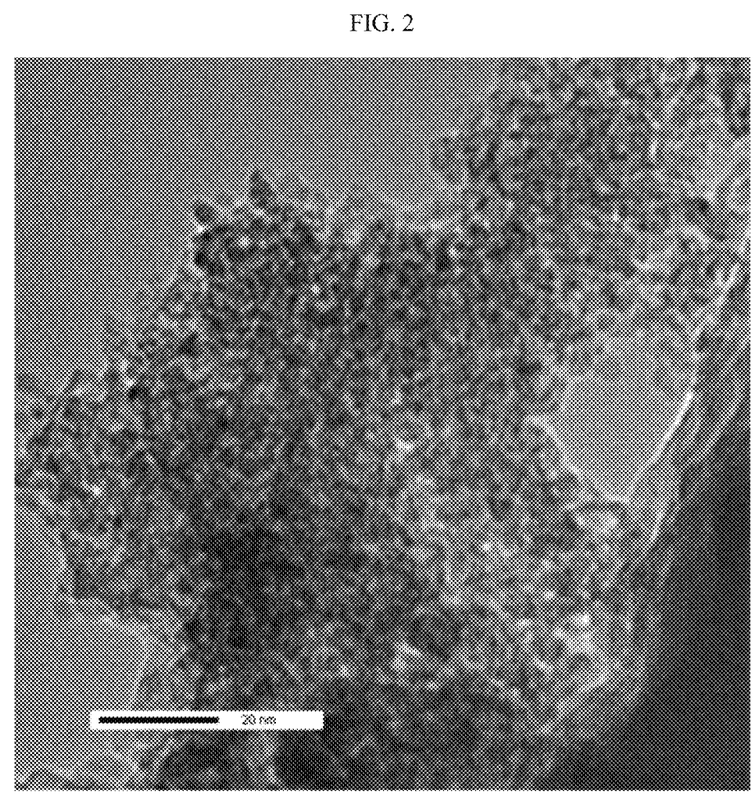
FIG. 2 is a transmission electron microscopy image of the stable iron (II) oxide and/or hydroxide of the preferred embodiment.

One gram of siderite (principally $FeCO_3$) was suspended by agitation in 60 ml of a 1 M KOH solution using a magnetic stirrer and heated to 40-50° C. until the color of the solid particles turned from light brown to black. This took approximately 10-20 minutes. Upon cessation of agitation, the black particles precipitated to the bottom of the flask showing a clear liquid phase on top. Due to their magnetic nature, they also agglomerated around the magnetic stirrer bar when it was not being agitated. The resulting suspension was analyzed using transmission electron microscopy as shown in FIG. 2. This established that the particles were generally in the 5-10 nanometer range. This evidences that the large particles not only were reacted to stable iron (II) oxides and/or hydroxides, but that they were also desegregated to form iron nanoparticles.

Ten milliliters of the resulting suspension were introduced into a glass bubbler containing the spent blank caustic solution from Example 1 and 6000 ppm of $H_2S/N_2$ were passed through the suspension in accordance with the procedure set forth in Reference Example 1. No GC peak associated with $H_2S$ was visible on the GC for 20 hours, at which point there was a breakthrough of $H_2S$. That is, the entire 6000 ppm of $H_2S$ were completely removed from the stream during 20 hours. After 20 hours of being exposed to the $H_2S$ stream, the sorbent sample in the bubbler showed a solid phase on the bottom and a clear grayish-yellow liquid phase on top. The black solid particles were still highly magnetic. Assuming a linear correlation between time to breakthrough and moles of KOH from Example 1, if the $H_2S$ removal was based solely on the amount of KOH in the sample of Example 2 (0.173 moles), that sample would have been expected to last only 12 hours before breakthrough. However, the sample of Example 2, which included the absorbent of the current invention, actually lasted for 20 hours before breakthrough. Thus, Example 2 shows a substantial improvement in sulfur removal over the blank caustic used in Example 1.

The pH of the alkaline solution in Example 2 was measured before and after the addition of one gram of siderite. Both values were similar, with a pH of about 13. This was confirmed by titration with HCl. In order to prove the consumption of part of the KOH by the ferrous carbonate from the siderite to form the stable iron (II) oxide and/or hydroxide, more siderite was added to the alkaline solution. In this case, as the siderite concentration increased, the pH difference was greater confirming that part of the KOH was being consumed to form the stable iron (II) oxide and/or hydroxide. It is important to notice than the difference in pH when adding one gram was not noticeable because of the large excess of KOH.

The liquid phase of the spent catalyst was analyzed with a microscope. The largest particle observed was 3 micrometers, however most of the smaller particles (nanometer range) were below the range that the microscope could measure. Even at the largest end, this reflects that the original 150 micrometer particles were reduced in size to be at least 50 times smaller.

The percentage sulfur loading of the sorbent can be calculated as follows:

$$\frac{\text{grams Sulfur}}{\text{grams Sorbent}} * 100\% = \frac{20 sccm * (\text{time in minutes}) * \left(\frac{6,000}{1,000,000}\right) * 32\frac{g}{mol}}{22.4\frac{mol}{1} * 1000 * \text{grams of sorbent}} * 100\%$$

In a typical reaction using a solid packed bed of shaped and calcined siderite, the resulting sulfur loading at breakthrough would be between 10-20% (25-50% based on iron content).

However, the calculated sulfur loading of the sorbent used in Example 2 was between 120-300% based on the iron content. This sulfur loading is determined as follows: when adding 10 ml of the alkaline stabilized iron (II) oxide and/or hydroxide, 0.0017 moles of iron (0.066 g) and 0.173 moles of KOH were added. Assuming a linear correlation between time to breakthrough and moles of KOH from Example 1, 0.173 moles of KOH would last for 12 hr. This implies that iron was absorbing $H_2S$ for 8 hours, showing a 120% sulfur loading based on the iron content. However, it is not known if there is a linear correlation between time to breakthrough and moles of KOH. Therefore considering 20 hours of absorbing $H_2S$ by the sorbent alone, the sulfur loading could be as high as 300%.

Further, as there was no agitation of the sorbent in the glass bubbler, part of the black solid particles dropped down to the bottom and were not directly exposed to the 6000 ppm of $H_2S/N_2$ flow. As a result, the actual mass of sorbent that reacted in the bubbler could be much less than the 0.165 grams that was started with. This would appear to be the case due to the presence of a solid phase that contained black particles that were still highly magnetic. This would make the sulfur loading even higher than the value estimated before.

Example 3

A second addition of 10 ml of sorbent prepared in the same manner as set forth in Example 2 was added to the spent caustic solution in the bubbler after the breakthrough was reached in Example 2. 6000 ppm of $H_2S/N_2$ were again passed through the suspension in accordance with the procedure set forth in Reference Example 1 and the system started absorbing $H_2S$ again. It is important to notice that in this case the life of the sorbent was 10 hours before breakthrough, which is shorter than the first time. Consequently, it is believed that the molar ratio between $OH^-$ and $Fe^{+2}$ should preferably be at least 4-6:1. Without being bound by theory, it is currently believed that this ratio allows for sufficient caustic to be able to convert the ferrous carbonate in the siderite to ferrous oxide/hydroxide as well as stabilize it so that it can then absorb $H_2S$. If the ratio is lower, the caustic may be able to react the siderite but it might not show a long life in absorbing $H_2S$. In addition, the fact that the alkaline solution was sitting exposed to air for a few days between Examples 2 and 3 could also have resulted in the reduced sorbent life shown in Example 3. Without being bound by theory, the exposure of the alkaline solution to air for a few days could have resulted in the absorption of $CO_2$ to form potassium carbonates, which would decrease the concentration of $OH^-$. The liquid phase of the spent sorbent in Examples 2 and 3 was then titrated with HCl in order to quantify the amount of caustic in the solution. During the titration, gas bubbles were being produced and released from the liquid. The gas was identified as $H_2S$ by the rotten egg smell released. In addition, during titration, the spent catalyst changed color from a clear grayish-yellow to clear green. This suggests that iron (II) chlorides ($FeCl_2$) were being formed. This provides further evidence that the initial black catalyst contains an iron (II) species.

Example 4

As discussed above, when stable iron (II) oxide and/or hydroxide was exposed to water, the particle color changed spontaneously from black to brown. Following Schikorr reaction, $Fe_3O_4$ is formed when Fe(II) hydroxides are exposed to water. In order to probe the absorption capacity of these iron species, 60 ml of water and 5 ml of the stable iron (II) oxide and/or hydroxide in the 1 M alkaline solution created according to Example 2 were added into a bubbler. Then 20 sccm of 6000 ppm of $H_2S/N_2$ were fed into the bubbler and the sample lasted approximately for 6 hours before breakthrough of $H_2S$ was detected in the outlet gas using GC. The pH of the sample before absorption was 12.6 and 9.6 after absorption. The color of the spent sample in this case was green and also showed a black precipitate at the bottom. In this case, assuming again a linear correlation between the initial concentration of KOH and hours of absorption, 5 ml of 1 M KOH would be expected to last for 6 hours before breakthrough. Therefore, the $F_3O_4$ nanoparticles didn't seem to show any $H_2S$ absorption capacity. It is important to consider that, there is no proof related to the linearity of the correlation between concentration of KOH and life, therefore more experiments are needed to understand the absorption capacity of $F_3O_4$ nanoparticles. It is currently believed though that the reactivity of iron (II) hydroxides towards the absorption of sulfur is much higher than the reactivity of iron (II) oxides.

Example 5

Figure 3:
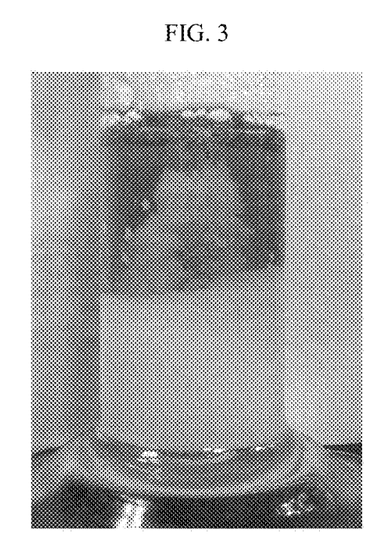
FIG. 3 is a picture of the formation and precipitation of sodium salts during $H_2S$ removal from Example 5.

Example 1 was repeated but using a 20% (3.6 M) NaOH solution instead of KOH. The outlet gas was monitored by a GC in order to quantify the amount of $H_2S$ that was absorbed as set forth in Example 1. It is important to mention in this case that during the adsorption of $H_2S$, low solubility sodium salts such as sodium sulfide ($Na_2S$) and sodium bisulfide (NaHS) were being produced and accumulated at the bottom of the bubbler making this process commercially difficult to operate. FIG. 3 shows the formation and accumulation of salts in the bubbler. After the absorption of approximately 7 grams of sulfur, which took about 700 hours, all the solution was converted to solids making the system not operable anymore. Consequently, another benefit of the sorbent of the current invention is that it makes the composition less difficult to work with.

Example 2 was also repeated using NaOH instead of KOH for the conversion of siderite and the absorption of $H_2S$. In this case, 7 grams of siderite were added to 60 ml of a 20% (3.6 M) NaOH aqueous solution under magnetic agitation in order to have a caustic to iron molar ratio of about 6:1. Following mixing, black particles precipitated to the bottom of the flask and agglomerated around the magnetic bar. After the siderite was converted to the stable iron (II) oxide and/or hydroxide, it was introduced into a bubbler and 20 sccm of 6000 ppm of $H_2S/N_2$ were fed as described in Example 1. The outlet gas was monitored by a GC in order to quantify the amount of $H_2S$ that was absorbed as set forth in Example 1. In this case, after absorbing approximately also 7 grams of sulfur over the same time period, a breakthrough was detected by the GC. The spent sorbent had a different appearance than the blank sample mentioned above. In this case, the sample was at least 80% liquid when it broke through. Consequently, another benefit of the sorbent of the current invention is that it makes the composition less difficult to work with.

In this example, the sorbent of the current invention when stabilized with NaOH instead of KOH did not result in an increased capacity for sulfur removal as compared to the blank NaOH caustic. However, the sorbent of the current invention does render it practical to remove sulfur in a commercial process. The blank caustic completely solidified while removing sulfur, which renders the process not feasible on a commercial scale. In contrast, the sorbent of the current invention remained at least 80% liquid at breakthrough. In addition, in contrast to spent caustic the spent material using the sorbent of the current invention is a safe, stable in air, non-hazardous and non-malodorous material. The spent sorbent can also be easily used to produce high purity desorbed hydrogen sulfide for use in downstream specialty chemical manufacture. In a commercial scale process, the blank NaOH caustic would not be allowed to convert entirely to solids as was done in this Example. Instead, it would be necessary to replace the caustic after approximately 1-2 grams of sulfur have been removed in order to allow the process to keep going. In contrast, in an embodiment of the sorbent of the current invention that is stabilized with NaOH, the amount of sorbent used would still be able to remove the entire 7 grams of sulfur in a commercial scale process. Thus, even where the theoretical sulfur removal capacity is approximately the same, the sorbent of the current invention still provides a significant advantage over the use of blank NaOH caustic as it would not lose a significant portion of its theoretical sulfur removal capacity when being scaled up to a commercial process.

Reference Example 6

Figure 4:
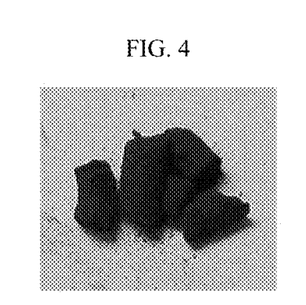
FIG. 4 is a picture of pelletized ferrous carbonate calcined at standard temperature.

In accordance with the teachings of U.S. Pat. Nos. 7,744,841 and 7,943,105, powdered siderite was mixed with a binder and water in order to produced formed particles. The final product was then dried and calcined at 350° C. The pale brownish color of siderite changes to deep red after calcination as shown in FIG. 4. A quartz tubular reactor with a bed length to bed diameter ratio of 10-20 was then filled with 40-50 grams of the sample. This corresponds to 34-48 grams of iron, depending on the exact binder concentration which is between 5-15%. A flow of 40 sccm of 6000 ppm of $H_2S/N_2$ was passed through the bed, resulting in a space velocity of 40 GHSV. The outlet gas was monitored by a GC in order to quantify the amount of $H_2S$ that is absorbed as set forth in Example 1. No breakthrough of $H_2S$ was observed in the outlet gas for 250-500 hours. The sulfur loading of this sorbent at breakthrough was calculated to be 10-20% (25-50% based on iron content) depending on the sample characteristics.

The comparison between the results of Reference Example 6 to Example 2 shows that the sorbent of the current invention provides a significant improvement over the prior ferrous carbonate absorbent. Assuming with respect to Reference Example 6 that there was 34 grams of iron and a 50% sulfur loading, one can calculate that the amount of sulfur removed from the fluid stream before breakthrough was 17 grams. Assuming the lowest sulfur loading of 120% for the sorbent of the current invention and ignoring the effect of the alkaline used to stabilize the sorbent, it would be expected that the sorbent of the current invention would require only a little over 14 grams based on the weight of iron in order to be able to remove the same 17 grams of sulfur from the fluid stream without breakthrough. If the sulfur loading is instead 287% as predicted based on the structure set forth in paragraph 16, it would instead only be expected to require approximately 5.9 grams based on the weight of iron to remove the same 17 grams of sulfur without breakthrough. Alternatively, if enough sorbent of the current invention were used to provide 34 grams by weight of iron, then (again ignoring the effect of the alkaline) it would be expected that almost 41 grams of sulfur could be removed from the fluid stream without breakthrough considering a conservative 120% sulfur loading. At 6000 ppm of $H_2S$ and 40 sccm, this would be approximately 2000 hours.

Example 7

Figure 5:
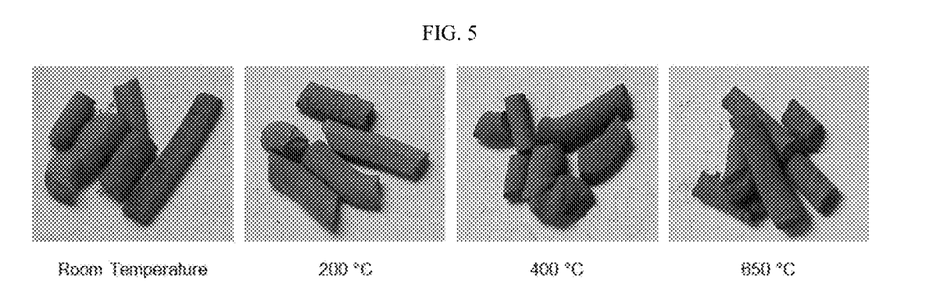
FIG. 5 is a picture of the stable iron (II) oxide and/or hydroxide supported on alumina, pelletized and calcined at different temperatures.

The stable iron (II) oxide and/or hydroxide in the alkaline media produced in Example 2 was used to impregnate inert supports such as alumina and attapulgite. The black iron precipitate produced in Example 2 was impregnated on alumina at a 40:60 ratio based on dry weight. Samples of the impregnated supports were then calcined at different temperatures, with the color of the final product being different depending on the calcination temperature and ranging from gray to dark pinkish brown. FIG. 5 depicts the impregnated alumina at room temperature and after being calcined at 200° C., 400° C. and 650° C. All of the alumina samples impregnated with the stable iron (II) oxide and/or hydroxide differ in appearance from the iron (II) carbonate with binder from Reference Example 6, as shown in FIG. 5. Preliminary absorption experiments suggest that the iron (II) oxide and/or hydroxide on the alumina support has a lower surlfur capacity at high GHSV as compared to the liquid sorbent shown in Example 2. However, it is possible that the high concentration of potassium could be interfering and decreasing the absorption capacity of the sorbent. Thus, use of a different alkaline media such as ammonia may provide a higher sulfur capacity.

Example 8

Various media such as surfactants, colloids and polymers were used to help suspend the iron (II) oxides and/or hydroxides in the alkaline solution. The currently preferred media is a crosslinked acrylic acid homopolymer. Samples of the crosslinked acrylic acid homopolymer were mixed with either an alkaline solution or water while flowing $N_2$ through it. A sample of the black precipitate containing the alkaline stabilized iron (II) oxide and/or hydroxide was added to each sample, resulting in a black gel. In both samples the black gel looking sample did not change color or settle down afterwards. This suggests that various media such as crosslinked acrylic acid homopolymer can be used to help keep the stabilized iron (II) oxides and/or hydroxides suspended in the alkaline solution.

Example 9

Figure 6:
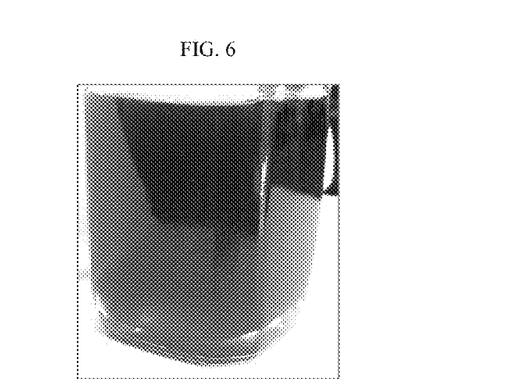
FIG. 6 is a picture of the liquid phase of siderite reacted with a 45% KOH solution at 40-50° C. for 10-20 minutes from Example 9.

Example 2 was repeated but using a higher concentration of KOH (45%), which corresponds to approximately 8 M, and a molar ratio of 6:1 KOH to Fe. In this case, after 10-20 minutes at 40-50° C., after cessation of magnetic agitation, the liquid phase had a green color instead of being clear as in the Example 2. The green liquid phase showed to be stable with time and had a pH of 12.6. Without being bound by theory, it is believed that by increasing the alkaline concentration more siderite was reacted as compared to Example 2 and the iron (II) hydroxide in this Example has an even smaller particle size, making this suspension stable. The green color might have been faded and less noticeable in Example 2 just because the extent of reaction was not as much as in this Example. Typical Iron hydroxide particles cannot be suspended by alkaline solutions because the particle size is too large. However, the Iron hydroxide particles produced by the new invention process can be suspended and remain stable in the suspension because their size is in the nanoscale range. FIG. 6 shows a photograph of the liquid phase after it had been separated from the solids at the bottom of the container.

Example 10

The following example was conducted to study the absorption of ethyl mercaptan by the pristine or not spent iron (II) stable solution of the current invention. Three vials, A, B, and C, each containing the same amount (approximately 50 ml) of mineral spirits as solvent were prepared. Approximately 1 ml of 1M KOH was added to vial B and approximately 1 ml of the stable iron (II) oxide and/or hydroxide prepared in accordance with the procedure set forth in Example 2 was added to vial C. Then, the same volume (approximately 0.3 ml) of pure ethyl mercaptan was added to each of vials A, B and C. After individually mixing vials B and C in order to help the absorption of mercaptans, the odor of the three samples was compared. Sample A had the characteristic smell of mercaptans. The smell of sample B was sweeter than the one from A, but still not as sweet as the one from C. The organic phase of samples A, B and C was injected in a Gas Chromatograph in order to quantify the amount of ethyl mercaptan. Samples A and B showed very similar concentration of ethyl mercaptan with values in the range of 3000 ppm. On the other hand, sample C, showed almost half of the initial concentration of ethyl mercaptan (1700 ppm), a 45% reduction in ethyl mercaptan. It is believed that the ethyl mercaptan forms a mercaptide of ferrous iron similar to the previously proposed structure for the hydro-sulfided complex with ferrous iron. This evidences that the sorbent of the current invention is superior to plain caustic in the absorption of mercaptans as well as hydrogen sulfide.

While the examples have been shown with a simulated feed, the novel absorbent can be used in connection with any liquid and/or gaseous stream that contains sulfur compounds, and in particular $H_2S$. The sorbent is especially useful in connection with removing sulfur compounds such as $H_2S$ from various hydrocarbon streams, including but not limited to: natural gas, light hydrocarbon streams, crude oil, acid gas mixtures, carbon dioxide gas and liquid streams, anaerobic gas, landfill gas, geothermal gases and liquids, and the like. Similarly, while the above description is provided in the context of bench scale testing, one of skill in the art will appreciate how to adapt this process to a commercial scale.

The above descriptions of certain embodiments are made for the purpose of illustration only and are not intended to be limiting in any manner. Other alterations and modifications of the invention will likewise become apparent to those of ordinary skill in the art upon reading the present disclosure, and it is intended that the scope of the invention disclosed herein be limited only by the broadest interpretation of the appended claims to which the inventors are legally entitled.

What is being claimed is:

1. A sorbent useful for removing sulfur compounds from fluid streams comprising:
   an iron (II) compound selected from the group consisting of oxides, hydroxides and mixtures thereof, wherein the iron in the sorbent is principally ferrous iron;
   an alkaline fluid capable of stabilizing the iron (II) compound and composed of an alkaline compound;
   wherein the molar ratio of alkaline compound in the fluid to iron (II) compound is at least about 4:1;
   wherein the sorbent is substantially free of chlorine and sulfate anions.

2. The sorbent of claim 1 wherein the iron (II) compound has a particle size less than 3 micrometers.

3. The sorbent of claim 2 wherein the particle size of the iron (II) compound is less than about 10 nanometers.

4. The sorbent of claim 1 wherein the iron (II) compound is an iron (II) oxide.

5. The sorbent of claim 1 where the iron (II) compound is an iron (II) hydroxide.

6. The sorbent of claim 1 wherein the alkaline fluid is selected from the group consisting of KOH, NaOH, and $NH_4OH$.

7. The sorbent of claim 6 wherein the alkaline fluid is KOH.

8. The sorbent of claim 7 wherein the KOH has a molarity of at least about 0.7.

9. A method of forming a sorbent comprising:
   providing an iron (II) carbonate;
   providing an alkaline fluid composed of an alkaline compound;
   mixing the alkaline fluid and iron (II) carbonate in a molar ratio of alkaline compound to iron (II) of at least about 4:1; and
   heating the mixture to at least 40° C. for a time sufficient to form an iron (II) compound selected from the group consisting of oxides, hydroxides and mixtures thereof, wherein the iron in the sorbent is principally ferrous iron and wherein the sorbent is substantially free of chlorine and sulfate anions.

10. The method of claim 9 where the iron (II) carbonate is provided by siderite.

11. The method of claim 9 wherein heat produced from dissolving or diluting the alkaline fluid provides the heating of the mixture to at least 40° C.

12. The method of claim 9 wherein the ratio of alkaline compound in the fluid to iron (II) carbonate is from about 4:1 to about 6:1.

13. The method of claim 9 where the iron (II) compound produced is an iron (II) hydroxide.

14. The method of claim 9 wherein the alkaline fluid is selected from the group consisting of KOH, NaOH, and $NH_4OH$.

15. The method of claim 14 wherein the alkaline fluid is KOH.

16. The method of claim 15 wherein the KOH has a molarity of at least about 0.7.

17. The method of claim 9 wherein the formation of an iron (II) compound is measured by the formation of a black precipitate.

18. The method of claim 9 wherein the heating step lasts for from about 10 to about 20 minutes.

19. The method of claim 9 wherein the alkaline fluid is NaOH and no additional heat is required to heat the mixture to at least 40° C.

20. A sorbent produced according to the process comprising:
   providing an iron (II) carbonate;
   providing an alkaline fluid composed of an alkaline compound;
   mixing the alkaline fluid and iron (II) carbonate in a molar ratio of alkaline compound to iron (II) of at least about 4:1; and
   heating the mixture to at least 40° C. for a time sufficient to form a black precipitate;
   wherein the sorbent is substantially free of chlorine and sulfate anions.

21. The sorbent of claim 20 where the iron (II) carbonate is provided by siderite.

22. The sorbent of claim 20 wherein heat produced from dissolving or diluting the alkaline fluid provides the heating of the mixture to at least 40° C.

23. The sorbent of claim 20 wherein the black precipitate is an iron (II) compound selected from the group consisting of oxides, hydroxides, and mixtures thereof.

24. The sorbent of claim 20 where the iron (II) compound produced is an iron (II) hydroxide.

25. The sorbent of claim 20 wherein the alkaline fluid is selected from the group consisting of KOH, NaOH, and $NH_4OH$.

26. The sorbent of claim 25 wherein the alkaline fluid is KOH.

27. The sorbent of claim 26 wherein the KOH has a molarity of at least about 0.7.

28. The sorbent of claim 26 wherein the heating step lasts for from about 10 to about 20 minutes.

29. The sorbent of claim 20 wherein the alkaline fluid is NaOH and no additional heat is required to heat the mixture to at least 40° C.

30. A method of removing sulfur compounds from a non-aqueous fluid stream comprising:
providing a fluid stream containing one or more sulfur compounds;
contacting the fluid stream with an alkaline stabilized iron (II) compound selected from the group consisting of oxides, hydroxides, and mixtures thereof;
wherein the iron in the alkaline stabilized iron (II) compound is principally ferrous iron and wherein the compound is stabilized with an alkaline fluid with a molar ratio of an alkaline compound in the fluid to iron (II) compound of at least about 4:1;
wherein the alkaline fluid and compound is substantially free of chlorine and sulfate anions.

31. The method of claim 30 wherein the stabilized iron (II) compound has a particle size less than 3 micrometers.

32. The method of claim 31 wherein the particle size of the stabilized iron (II) compound is less than about 10 nanometers.

33. The method of claim 30 wherein the stabilized iron (II) compound is an iron (II) oxide.

34. The method of claim 30 where the stabilized iron (II) compound is an iron (II) hydroxide.

35. The method of claim 30 wherein the alkaline used to stabilize the alkaline stabilized fluid is selected from the group consisting of KOH, NaOH, and $NH_4OH$.

36. The method of claim 35 wherein the alkaline is KOH.

37. The method of claim 30 wherein the sulfur compound is $H_2S$.

38. The method of claim 30 wherein the fluid stream is selected from the group consisting of natural gas liquids ("NGL"), crude oil, acid-gas mixtures, carbon dioxide gas and liquid streams, anaerobic gas, landfill gas, geothermal gas, other hydrocarbon streams, and mixtures thereof.

39. The method of claim 38 wherein the sulfur compound is $H_2S$.

40. The method of claim 39 wherein the alkaline is KOH.

41. The method of claim 30 further comprising forming the stabilized iron (II) compound using the method comprising:
providing an iron (II) carbonate;
providing an alkaline fluid;
mixing the alkaline fluid and iron (II) carbonate in a molar ratio of alkaline compound to iron (II) of at least about 4:1; and
heating the mixture to at least 40° C. for a time sufficient to form the stabilized iron (II) compound.

42. The method of claim 41 where the iron (II) carbonate is provided by siderite.

43. The method of claim 41 wherein heat produced from dissolving or diluting the alkaline fluid provides the heating of the mixture to at least 40° C.

44. The method of claim 41 wherein the alkaline fluid is selected from the group consisting of KOH, NaOH, and $NH_4OH$.

45. The method of claim 44 wherein the alkaline fluid is KOH.

46. The method of claim 45 wherein the KOH has a molarity of at least about 0.7.

47. The method of claim 41 wherein the formation of an iron (II) compound is measured by the formation of a black precipitate.

48. The method of claim 41 wherein the heating step lasts for from about 10 to about 20 minutes.

49. The method of claim 41 wherein the alkaline fluid is NaOH and no additional heat is required to heat the mixture to at least 40° C.

50. The method of claim 41 wherein the ratio of the alkaline fluid to the iron (II) carbonate is from about 4:1 to about 6:1.

51. The method of claim 41 where the stabilized iron (II) compound is an iron (II) hydroxide.

52. A sorbent useful for removing sulfur compounds from fluid streams comprising:
an iron (II) oxide compound wherein the iron in the sorbent is principally ferrous iron;
an alkaline fluid capable of stabilizing the iron (II) compound and composed of an alkaline compound;
wherein the molar ratio of alkaline compound in the fluid to iron (II) compound is at least about 4:1.

53. The sorbent of claim 52 wherein the iron (II) compound has a particle size less than 3 micrometers.

54. The sorbent of claim 52 wherein the particle size of the iron (II) compound is less than about 10 nanometers.

55. The sorbent of claim 52 wherein the alkaline fluid is selected from the group consisting of KOH, NaOH, and $NH_4OH$.

56. The sorbent of claim 55 wherein the alkaline fluid is KOH having a molarity at least about 0.7.

57. The sorbent of claim 52 wherein the sorbent is substantially free of chlorine and sulfate anions.

58. A sorbent useful for removing sulfur compounds from fluid streams comprising:
an iron (II) compound selected from the group consisting of oxides, hydroxides and mixtures thereof;
an alkaline fluid capable of stabilizing the iron (II) compound;
wherein the particle size of the iron (II) compound is less than about 10 nanometers.

59. The sorbent of claim 58 wherein the iron (II) compound is an iron (II) oxide.

60. The sorbent of claim 58 wherein the iron (II) compound is an iron (II) hydroxide.

61. The sorbent of claim 58 wherein the alkaline fluid is selected from the group consisting of KOH, NaOH, and $NH_4OH$.

62. The sorbent of claim 61 wherein the alkaline fluid is KOH having a molarity at least about 0.7.

63. The sorbent of claim 58 wherein the sorbent is substantially free of chlorine and sulfate anions.

64. The sorbent of claim 1 wherein the molar ratio of alkaline compound in the fluid to iron (II) compound is about 6:1.

65. The method of claim 9 wherein the alkaline fluid is mixed with the iron (II) carbonate in a molar ratio of alkaline compound to iron (II) of about 6:1.

66. The method of claim 30 wherein the compound is stabilized with an alkaline fluid with a molar ratio of alkaline compound in the fluid to iron (II) compound of about 6:1.

* * * * *